United States Patent
Wubbels et al.

(10) Patent No.: US 6,487,839 B2
(45) Date of Patent: Dec. 3, 2002

(54) GATHERING AND PICKING UNIT FOR A HARVESTING ASSEMBLY

(75) Inventors: Richard Wubbels, Rhede (DE); Norbert Wolters, Gescher (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/788,029

(22) Filed: Feb. 16, 2001

(65) Prior Publication Data

US 2001/0018357 A1 Aug. 30, 2001

(30) Foreign Application Priority Data

Jul. 26, 2000 (DE) .......................... 100 09 199

(51) Int. Cl.$^7$ .............................................. A01D 45/02
(52) U.S. Cl. ................................. 56/64; 56/94
(58) Field of Search ................................ 56/53, 59, 60, 56/66, 69, 75, 82, 88, 93, 94, 98, 99, 100–106, 111, 119

(56) References Cited

U.S. PATENT DOCUMENTS

| 4,581,878 | A | | 4/1986 | Vida et al. ..................... 56/114 |
| 4,864,807 | A | | 9/1989 | Ostrup et al. .................. 56/60 |
| 5,212,935 | A | * | 5/1993 | Sanders et al. ................. 56/66 |
| 5,916,113 | A | | 6/1999 | Johnson ......................... 56/94 |
| 6,119,443 | A | * | 9/2000 | Ruach ........................... 56/64 |

FOREIGN PATENT DOCUMENTS

| DE | 3 616 717 | 11/1987 |
| DE | 0 492 082 | 10/1991 |
| DE | 197 34 747 | 2/1999 |

* cited by examiner

Primary Examiner—Robert E. Pezzuto

(57) ABSTRACT

A gathering and picking unit for a harvesting assembly having a plurality of picking units. Each picking unit is provided with at least one picking roll. The picking rolls are rotatably mounted to the outer portion of a moving element that is rotated about a second vertical axis. Each picking roll is rotated about a first horizontal axis. The picking units can be arranged radially or tangentially on the moving element.

17 Claims, 3 Drawing Sheets

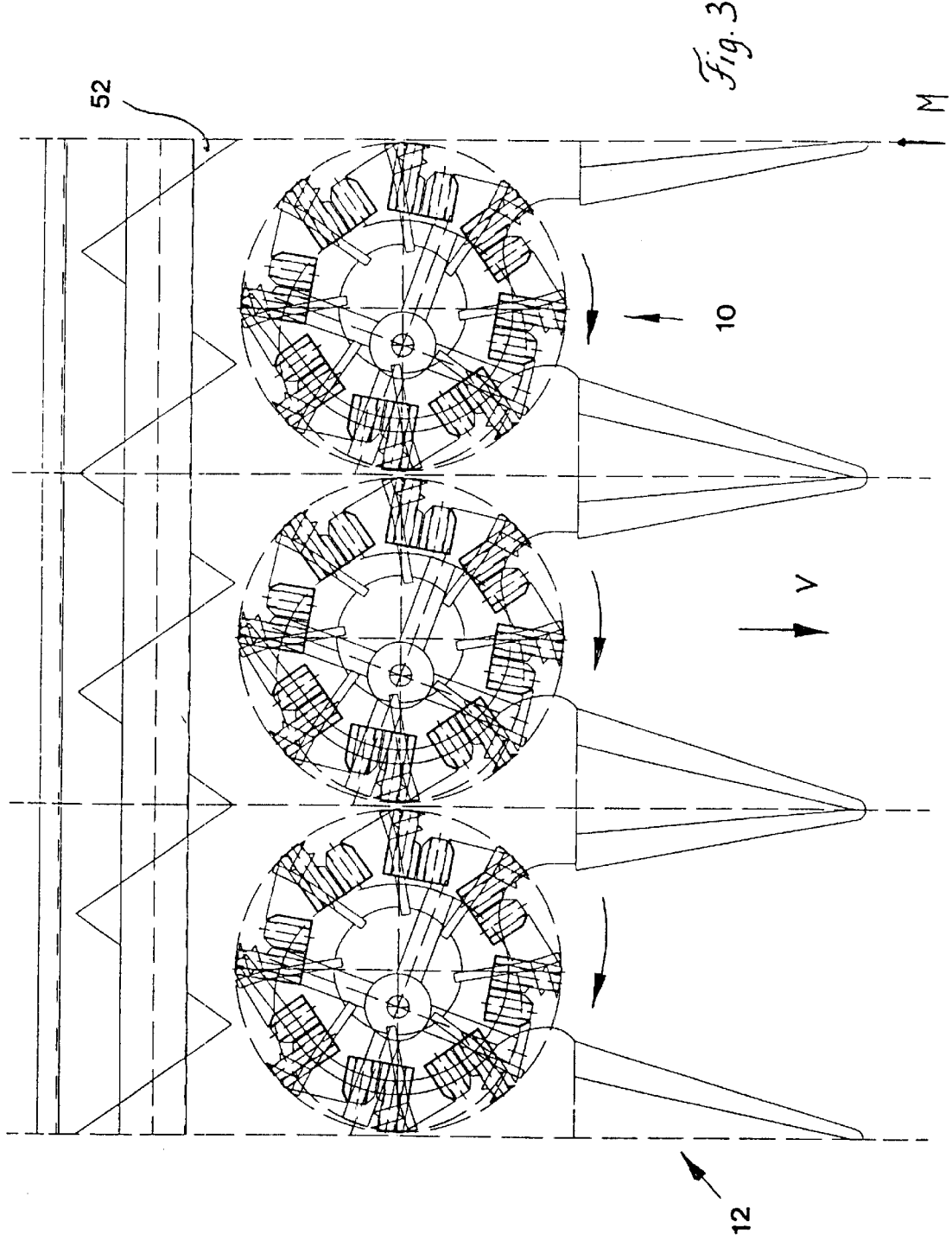

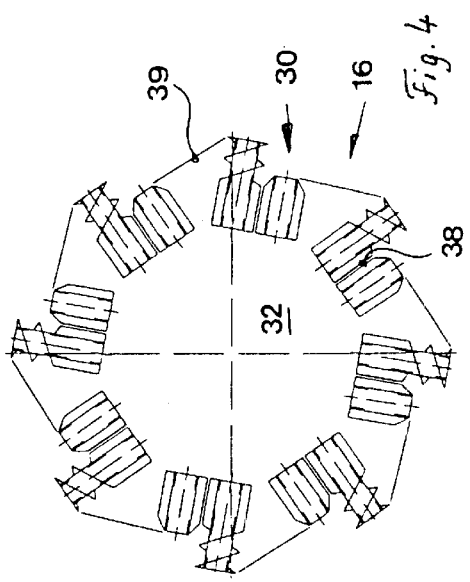
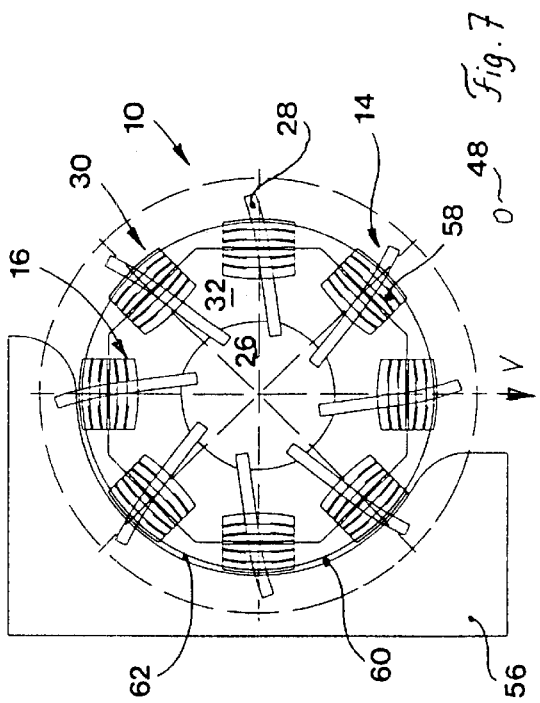
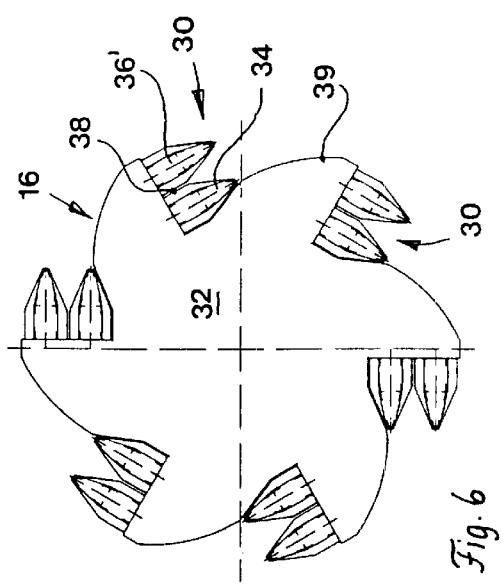
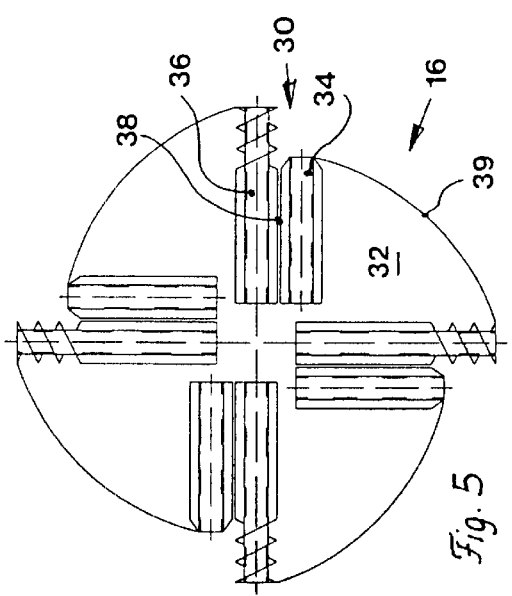

GATHERING AND PICKING UNIT FOR A HARVESTING ASSEMBLY

BACKGROUND OF THE INVENTION

1. Field of the Invention

The present invention is directed to the gathering and picking unit of a harvesting assembly wherein one picking roller rotates about a first axis, which is arranged to draw plants through a picking channel through which parts of the plants are separated.

2. Description of the Prior Art

DE 197 34 747 A describes a corn harvesting header that can be installed on a self-propelled harvesting machine. The header can mow independent of rows and pick the ears of corn from the stalks, in order to process them separately from the rest of the plant. For gathering the plants and mowing them independent of rows the implement is equipped with a mower head having a rotating drum. The rotating drum is provided with recesses on its outer circumference for gathering the plants. A knife is rotated below the recesses for cutting the stalks. The plants are then conducted to conventional picking assemblies attached downstream of the mower head. Since the transport path of the plant can be very long, the danger exists that the plants can be dropped or fall over during the gathering and picking operations.

SUMMARY

It is an object of the present invention to provide a gathering and picking unit having a simple and functional configuration.

The fundamental idea consists of arranging the picking roll in a harvesting implement on an element that moves with respect to the remaining components of the gathering and picking arrangement. As such, the picking roll moves in a path along which the plants can also be carried. A stalk of the plant is grasped by the picking roll at one of the many possible points of the path and carried along on it. During this movement the stalk of a plant is drawn in by the picking roll rotating in a known manner and the plant is drawn through a picking channel. Thereby useful plant components, such as ears of corn or sunflower fruit are retained in the picking channel and subsequently conducted to an arrangement for further processing. As a rule the picking roll has drawn in the entire plant after a portion of a revolution around the path and is free to grasp another plant. It would be conceivable to let the plant perform several revolutions. It should be noted that only the picking roll and the element retaining the picking roll move with respect to the remaining components of the gathering and picking arrangement, but not necessarily the picking channel. As a rule the picking channel itself is stationary and is attached to the gathering and picking arrangement.

In this way a gathering and picking arrangement is obtained in which the plants can be grasped by the picking roll at various points on a path of movement performed by the picking roll. The gathering and picking arrangement is therefore able to grasp the stalks of the plants independent of rows. Hence the gathering and picking arrangement can be configured as a very compact unit.

The movement of the picking roll can be performed along any desired path. It can be performed in particular along a rectangular or elliptical path or in rotation about a second axis that differs from the rotational axis of the picking roll. The second axis, about which the retaining element rotates, need not extend through the picking roll, but is arranged, as a rule, spaced at a distance from it. The advantage of a circular movement lies in the fact that it can be attained without any problem.

Since the picking roll moves, in particular rotates about the second axis, this movement can be utilized to transport the plant over the length of the picking channel. A separate drive arrangement that carries the plants through the picking channel by chains that are subject to wear is thereby omitted. In this case the picking roll can also be configured relatively short, since a movement of the plant along the longitudinal direction of the picking roll on the basis of the movement during the picking is not necessary.

The second axis, about which the picking roll is rotated, is preferably oriented at least approximately vertically. Thereby the direction of rotation conforms to the direction of growth of most plants. It would also be conceivable to orient the second axis horizontally, in order to harvest fruit at the side of a plant, for example, grapes. Analogously the direction of rotation of the picking roll, as a rule, is at least approximately horizontal. Due to the rotation of the picking roll about the second axis, the rotational axis of the picking roll circulates about the second axis.

Furthermore it is proposed that the picking roll or picking rolls be arranged at the outer circumference of a retaining element. The retaining element rotates about the second axis, that preferably extends through the centerline of the retaining element. The retaining element may be equipped with assemblies for supporting and rotating the picking roll or picking rolls. In particular appropriate gears can convert the rotational movement of the retaining element about the second axis into the rotational movement of the picking roll or picking rolls about the first axis.

The stalks of the plants are drawn into a slot that is defined in the preferred configuration between two interacting picking rolls. The picking rolls rotate in opposite directions and draw in the stalk of a plant downward. The slot can extend (at least partially) radially to the retaining element. In this case the stalk of the plant must be introduced in radial direction into the slot. Alternatively the slot may extend in the direction of rotation of the retaining element, that is, at least approximately tangential to the circumference of the retaining element. The introduction of the plant into the slot is simplified thereby, since the longitudinal direction of the slot and its direction of rotation coincide. It should be noted that other directions of orientation of the slot that lie between the tangential and the radial direction are possible.

In an alternate embodiment, the slot into which the stalks of the plants are drawn is defined between a rotating picking roll and a fixed wall. The wall may be stationary and hence need not rotate with the picking roll. With a stationary wall the picking roll is carried along by the rotation of the retaining element about the second axis. In this case the slot has an arc shape. Alternatively the fixed wall is arranged at the retaining element of the picking roll. In this case the slot can be oriented, as explained above, tangentially to the circumference of the retaining element, in the radial direction or at an intermediate angle.

In order to simplify the introduction of the plants into the slot a picking roll is equipped with a screw conveyor arranged at its point. Alternatively, or in addition, the picking rolls can be provided with cone-shaped points that simplify the introduction of the stalks of the plants.

A plant standing in a field is not always directly grasped by a picking assembly, that is, a picking roll interacting with a second picking roll or a wall. In order to simplify the introduction into the slot, an obvious solution would be to form the radially outer surface of the retaining element between two successive picking assemblies in a straight-line or a curved pattern in such a way that this surface can slide along the plant. In this way the plant is conducted into a following picking assembly without any resistance.

Furthermore it is proposed that a rotating gathering device be provided above the picking device that is able to grasp plants independent of rows and to introduce them into the picking channel. The gathering device conducts the plant preferably also into the slot of a picking assembly, in case it is not automatically drawn in by the latter. Such a gathering device may be provided with a number of fingers that extend generally in the radial direction. As a rule the number of fingers coincides with the number of picking assemblies. Preferably the fingers are curved in the trailing direction, so that their leading surface is provided with a rejecting conveying performance. In this way the stalks of the plants are forced to circulate about the points of the fingers and come into contact with their trailing surface, which, for its part, aggressively conveys them to the interior. The gathering device is arranged with an appropriate diameter to grasp plants over an adequate operating width to draw them in independent of rows. In order to increase the operating width further, stalk dividers may be arranged ahead of the gathering and picking arrangement.

Preferably the gathering device is arranged in such a way that it is able to transport the plant over the entire effective length of the picking channel. As a rule the transport of the plant through the picking channel is performed together with the picking roll, which also holds the plant and transports it over the length of the picking channel on the basis of its rotation about the second axis.

A sheet metal stripper plate into which the picking channel is formed, is preferably arranged above the picking roll. As a rule it is stationary. The gathering device is located appropriately above the sheet metal stripper plate. For reasons of better design and to improve the transport of the plants an obvious solution is to have the gathering device and the retaining element of the picking roll rotate about coaxial axes.

As already explained, the picking roll transports the plant along a circular path during its rotation about the second axis. Thereby the plant is drawn through the picking channel. In order to avoid an undesirable bending of the plant, it is proposed that the picking channel also extend in an arc, in particular, corresponding to the path of the picking assemblies in a circular arc.

The gathering and picking unit of the present invention is used on harvesting assemblies. Harvesting assemblies of this type are called pickers as they separate the useful part of the stalk. Such machines are used to harvest corn and sunflowers.

With relatively wide pickers an obvious solution is to provide gathering and picking units that are symmetrical to each other on both sides of a line of symmetry that coincides with the centerline of the harvesting assembly. The symmetry permits a uniform distribution of the weight that avoids undesirable torques transmitted to the machine to which the crop recovery arrangement is fastened.

Although the gathering and picking unit operates independently of rows, it may be useful to attach to a harvesting assembly so that is can be mounted in different transverse positions. If necessary the sheet metal stripper plates of adjacent gathering and picking arrangements may be overlapped so that no undesirable gaps develop between them upon sliding to the side. Alternatively, or in addition, additional sheet metal cover plates may cover any gaps remaining between adjacent gathering and picking arrangements.

Finally, adjacent gathering and picking arrangements attached at varying heights are conceivable, in order to reduce the minimum spacing between units.

BRIEF DESCRIPTION OF THE DRAWINGS

FIG. 3 is a plan view of three gathering and picking units arranged on a harvesting assembly.

FIG. 4 shows a plan view of the picking device of the gathering and picking unit of FIG. 1.

FIG. 5 shows a plan view of a second embodiment of a picking device.

FIG. 6 shows a plan view of a third embodiment of a picking device.

FIG. 7 shows a plan view of a gathering and picking unit with a fourth embodiment of a picking device.

DETAILED DESCRIPTION

Figure 1:
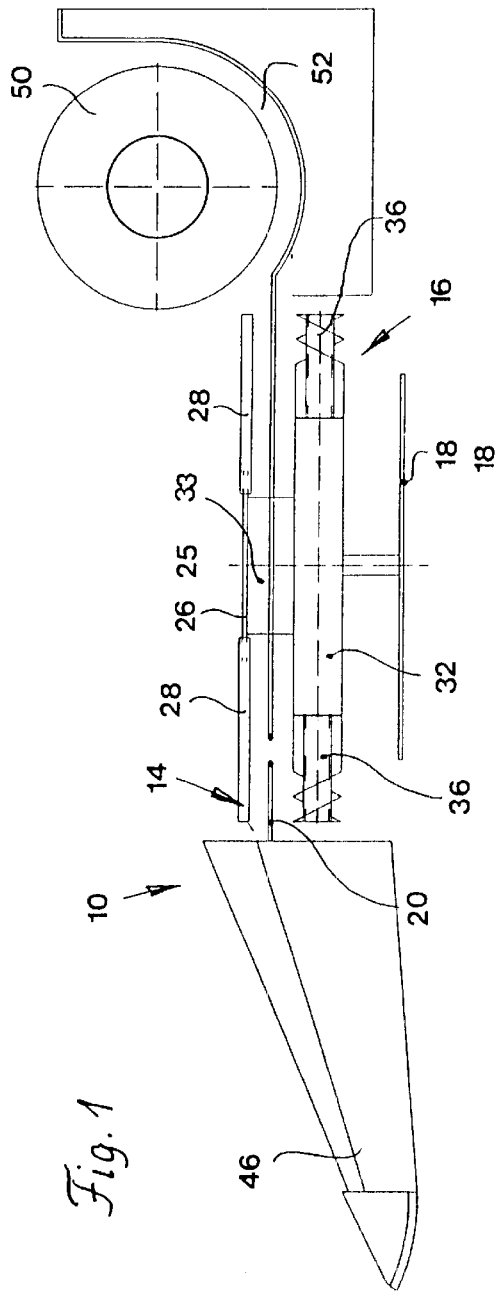
FIG. 1 is a side view of a gathering and picking unit of a harvesting assembly.

FIG. 1 shows a gathering and picking unit 10 of a harvesting assembly 12, illustrated in FIG. 3. The harvesting assembly 12 is provided with a multitude of gathering and picking units 10, although it would be conceivable to equip a harvesting assembly 12 with only a single gathering and picking unit 10. In its basic configuration the gathering and picking unit 10 comprises an upper gathering device 14, a rotating chopper knife 18 and a picking device 16 which are arranged underneath a picking channel 22 located in a sheet metal stripper plate 20.

Figure 2:
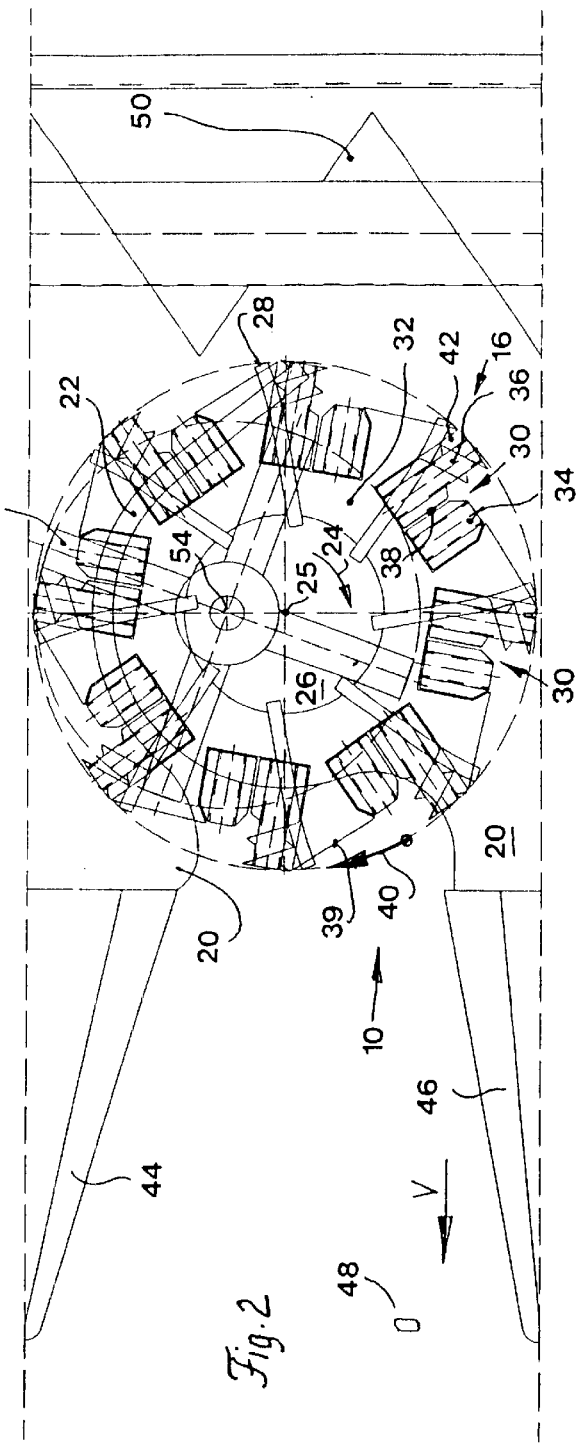
FIG. 2 is a plan view of the gathering and picking unit of FIG. 1.

The upper gathering device 14 is used to grasp and draw in the plants to be harvested. Gathering device 14 is arranged so as to be able to rotate about a vertical axis 25 that is rotated by a drive not shown in the drawings. As seen in FIG. 2, the rotation is performed in clockwise direction as indicated by the arrow 24. The upper gathering device 14 is arranged above the sheet metal stripper plate 20. The axis of rotation 25 of the upper gathering device 14 extends generally in the vertical direction, but it may also be inclined slightly forward. In its basic configuration the gathering device 14 comprises a central disk 26 with fingers 28 distributed over its circumference that extend generally in the radial direction and are curved in the plane of a disk 26 opposite to the direction of rotation, that is, in the trailing direction. The leading edges of the fingers 28 therefore have a rejecting conveying performance. Alternatively, or in addition to the curvature of the fingers 28, a vertical movement of the fingers would be conceivable as is known from cutter heads, and can be attained by an eccentric movement in order to attain a rejecting conveying performance. A control of the angle of the fingers relative to a vertical axis, that is, a pivoting, would be conceivable in order to attain a desired conveying performance. The pivoting movement could also be combined with the radial movement.

The picking device 16 is arranged underneath the upper gathering device 14 and the sheet metal stripper plate 20. It includes several picking assemblies 30 that are distributed about the circumference of the central retaining element 32. Each of the picking assemblies 30 is provided with a pair of picking rolls 34, 36, whose longitudinal axes are oriented at least approximately parallel to each other and generally radial to the central retaining element 32. The slot 38 formed between each pair of the associated picking rolls 34, 36 is also oriented radially. The picking rolls 34, 36 rotate about their longitudinal axes, but rotate in different directions so that they can draw the plant stalk downward through the slot 38 formed between the picking rolls. The picking device 16 rotates in the direction of the arrow 40 about its central vertical axis extending through the central retaining element 32. This central axis coincides with the axis 25, about which the upper gathering device 14 rotates.

The number of fingers 28 of the upper gathering device 14 coincides with the number of picking assemblies 30 of the picking device 16. In the embodiment illustrated in FIGS. 1 and 2 there are eight picking assemblies and eight fingers 28. Each of the fingers 28 is arranged behind the trailing picking roll 36. The fingers 28 support the stalk of a plant 48 clamped in the slot 38. As a rule the rotational speeds of the picking device 16 and the upper gathering device 14 are equal, although they may be selected to differ to a slight degree. Drive arrangements for the picking rolls 34, 36 are arranged in the interior of the central retaining element 32. The drive arrangements convert the rotational movement of the central retaining element 32 by appropriate bevel gears, or the like, into rotational movements of the picking rolls 34, 36. Between the central disk 26 of the upper gathering device 14 and the central retaining element 32 a housing 33 is provided in which drive elements for the picking device 16 and/or the gathering device 14 can be housed.

The leading picking roll 34 and the trailing picking roll 36 of a picking assembly 30 are defined by the direction of rotation 40. The trailing picking roll 36 is provided with an outer section 42, that radially projects past the outer end of the leading picking roll 34. The outer section 42 is provided with spiral-shaped drivers in the form of a screw conveyor, in order to pull the stalk into the slot 38 between the picking rolls 34, 36. The remaining, inner section of the trailing picking roll 36 and the leading picking roll 34 are relatively conventional. The rolls 34 and 36 are provided with several flutes that extend axially and project radially outward. The flutes are used to engage the stalk of the plant and pull it downward. These flutes are beveled at the outer end of the picking rolls 34, 36 in order to simplify the introduction of a stalk into the slot 38. The central retaining element 32 is provided with a radially outer surface 39 that extends between two successive picking assemblies 30. Outer surface 39 extends between the outer section 42 of the trailing picking roll 36 of a first picking assembly 30 and the outer section of the leading picking assembly 30 of a second successive picking assembly 30. The surface 39 has the effect that the stalk of a plant 48 can slide along it (or it can slide along the stalk of a plant 48) and be guided into the slot 38 of the trailing picking assembly 30.

As can be seen in FIG. 2 of the gathering and picking unit 10, stalk dividers 44, 46 are arranged ahead of the gathering device 14 and the picking device 16 in the forward direction of movement V of the harvesting assembly. The stalk dividers 44, 46 direct the plants that are not standing directly in front of the gathering device 14 into the interior, so that they reach the operating region of the gathering device 14 and the picking device 16. The leading edge of the sheet metal stripper plate 20 is curved in such a way that the stalks of the plants 48 are forced to the side into the operating region of the gathering device 14 and the picking device 16. The operating region of the gathering device 14 is defined by the length of the fingers 28 and is sufficiently large that the gathering and picking unit 10 can operate independent of rows, as the plants interact with the curved leading edge of the sheet metal stripper plate 20 and the stalk dividers 44, 46.

As shown in FIG. 2, depending on its location, the stalk of a plant 48 standing on a field slides along the stalk dividers 44, 46, the leading edge of the stripper plate 20 and/or outer surface 39 of the central retaining element 32. After the stalk has been bent in the direction of the center of the gathering and picking arrangement 10 it is grasped by the outer section 42 of a trailing picking roll 36 and is drawn into the slot 38 of the picking assembly 30. However, it is also conceivable that the stalk of the plant 48 first comes into contact with a finger 28 of the upper gathering device 14. Due to the trailing, and hence rejecting, curvature of the finger 28, the stalk of the plant 48 is then forced radially outward until it has rounded the tip of the finger 28. Due to the rotation of the gathering device 14 and the picking device 16, the stalk of the plant 48 slides along the outer surface 39 of the central retaining element 32 and is directed to the outer section 42 of the trailing picking roll 36. Again the picking assembly 30 pulls the stalk downward by the rotating picking rolls 34, 36. As a rule the stalk of the plant 48 that has not yet been separated from the field is thereby bent to the side and/or in the direction of forward movement V.

The sheet metal stripper plate 20 is arranged vertically between the upper gathering device 14 and the picking device 16. The picking channel 22 is provided in the sheet metal stripper plate 20 that initially narrows against the direction of forward movement V and then extends to the rear in a circular arc alongside the axis of rotation 25 of the gathering device 14 and the picking device 16. The picking channel 22 is covered over its entire length by the region of rotation of the gathering device 14 and the picking device 16. The beginning (entrance) of the picking channel 22 is located with respect to the forward direction of movement ahead of the axis of rotation 25 of the gathering device 14 and the picking device 16. It would be conceivable in place of the sheet metal stripper plate 20 to arrange a rotating picking disk with at least one picking slot circulating in the direction of rotation above the picking roll. The picking slot of the picking disk is provided with an opening at the outer circumference of the picking disk. Furthermore the picking disk may be overlapped on its upper side in some regions by a cover arrangement that is provided with a conveying channel for the transport to the harvesting vehicle of the useful components of the plants that have been stripped from the plant. In this embodiment the picking disk is used to grasp the plants and simultaneously for the picking, where the picking roll draws the plant in downward. Such a picking disk is disclosed by DE 199 39 723, whose disclosure is incorporated herein by reference.

The stalk of a plant 48 grasped by a picking assembly 30 is pulled downward by the counter-rotating movement of the picking rolls 34, 36. Rotation of the picking device 16 carries the stalk of the plant 48 along in the direction of rotation 40 so that, that portion of the stalk lying above the picking assembly 30 and below the upper gathering device 16 is introduced into the picking channel 22 of the sheet metal stripper plate 20. The width of the picking channel 22 is selected in such a way that useful plant components, particularly ears of corn, sunflower fruit and the like, are separated from the stalk of the plant 48 by the sheet metal stripper plate 20. The useful plant components are then conveyed in a trough 52 lying under a screw conveyor 50 that extends transverse to the direction of forward movement V. The channel can be formed in a corresponding cover that is arranged above the sheet metal stripper plate 20. In addition, the cover protects the upper gathering device 14 against unintended contact. The upper gathering device 14 and the following useful plant components support the transport of the useful components into the trough. The screw conveyor 50 delivers the useful components of the plants from the trough 52 into a machine in which the useful components are processed. The machine may comprise a combine having threshing and separating assemblies, a forage harvester having a chopper assembly or a machine that conveys the useful components to a trailer or the like.

During the picking process the upper gathering device 14 and the picking device 16, which also rotates, provide assurance that the stalk of a plant 48 is transported over the length of the picking channel 22. The stalk of the plant 48 is clamped in the slot 38 between each of two picking rolls 34, 36 and is supported over the greatest part of the picking process by a finger 28 of the upper gathering device 14. The rotational speeds of the picking rolls 34, 36 and of the gathering device 14 as well as the picking device 16 are preferably designed in such a way that the entire plant is drawn downward into the picking channel 22 when it has reached the end of the picking channel 22.

The remainder of the stalks of the plants 48, which are transported away downward by the picking rolls 34, 36, reach the operating region of a four-armed chopper knife 18 rotating underneath the picking device 16, and are cut by this into individual pieces. Thereby, chopped plant remains are deposited on the field. At that time, the stalk of a plant 48 clamped in the slot 38 of the picking assembly 30 is supported by the picking device 16, which forms a shear bar. The chopper knife 18 rotates about a vertical axis of rotation 54 which is arranged with respect to the direction of forward movement V to the side between the axis of rotation 25 and the picking channel 22. In the vertical direction the chopper knife 18 is positioned underneath the picking rolls 34, 36. The direction of rotation of the chopper knife 18, as seen in FIG. 2, is clockwise, so that the chopped crop is thrown to the side and to the rear. The operating region of the chopper knife 18 extends generally over the entire length of the picking channel 22. It is dimensioned in such a way that the stalks of the plants 48 are initially clamped between the picking rolls 34, 36 and are then cut by the chopper knife 18 as they are pulled downwardly.

FIG. 3 shows one-half of a harvesting assembly 12 with a total of six gathering and picking units 10. All of the picking channels 22 shown in FIG. 3 are arranged to the right side of the axes of rotation 25 of the gathering devices 14 with respect to the forward direction of movement V. The screw conveyor 50 conveys the useful plant components in the direction of the centerline M of the harvesting assembly 12, from which point they are transported away for further processing. Therefore a feederhouse of a combine or the gathering region of a forage harvester can be arranged on the rear side of the crop recovery arrangement 12. The three gathering and picking units 10 arranged to the right of the centerline M are not shown in FIG. 3. These right hand units may be symmetrical to those shown in FIG. 3, that is, they rotate in opposite directions of rotation, which has the resulting advantage that the torque load applied to the harvesting vehicle is symmetrical. More or fewer gathering and picking units 10 than the three shown here may be located on both sides of the centerline M, where preferably equal numbers of gathering and picking arrangements are arranged to both sides of the vertical center plane of the harvesting assembly 12. The gathering and picking units rotate most appropriately in clockwise direction on the one side of the longitudinal center plane and in counterclockwise direction on the other side. But it is also conceivable that all gathering and picking units are configured identically to lower manufacturing costs.

A gearbox, not shown, may be provided to drive the chopper knife 18, the gathering device 14 and the picking device 16. The gearbox is driven by a through drive shaft, also not shown. The gathering and picking unit 10 is preferably attached to a carrier, not shown, that extends over the width of a harvesting assembly 12, so that the units can be selectively positioned along the transverse width of the harvesting assembly 12. For this purpose a slidable fastening arrangement may be attached to the carrier. The fastening arrangement retains the gearbox, the picking device 16, the sheet metal stripper plate 20 with the stalk dividers 44, 46 and the gathering device 14. Any intervening spaces that develop during the sliding between sheet metal stripper plates 20 of adjoining gathering and picking arrangements 10 can be covered by appropriate sheet metal covers or the like.

FIG. 4 again shows the picking device 16 that was illustrated in FIGS. 1 through 3. It includes eight picking assemblies 30 each defining a radial slot 38 for drawing in the stalk of a plant 48. The radially outer surface 39 of the central retaining element 32 between adjoining picking assemblies 30 is formed in such a way that the stalk of a plant 48 is introduced automatically into a following slot 38. It extends in a straight line from the point of a trailing picking roll 36 of a first leading picking assembly 30 up to the point of a leading picking roll 36 of a second following picking assembly 30.

FIG. 5 shows a second embodiment of a picking device 16. Four picking assemblies 30 are distributed uniformly around the circumference of the central retaining element 32, that correspond in their basic configuration to the picking assemblies shown in FIG. 4. The slot 38 also extends approximately in radial direction toward the axis of rotation of the picking device 16. The individual picking rolls 34, 36 are approximately 2.5 times as long as those shown in FIG. 4, and are generally of the same diameter. The greater length of the picking rolls 34, 36 compared to those in the embodiment of FIG. 4 is combined with a reduction in the number of picking assemblies 30 for reasons of space. Since a greater number of stalks of plants 48 can be processed simultaneously by a picking assembly 30, the capacity is approximately the same, however, the design and mechanical costs are reduced in comparison to the embodiment shown in FIG. 4. The radially outer surface 39 of the retaining element 32 between the picking assemblies 30 extends in the form of an arc between the outer point of a trailing picking roll 36 of a first leading picking assembly 30 and the outer point of the leading picking roll 34 of a second following picking assembly 30.

A third embodiment of a picking device 16 is shown in FIG. 6. Six picking assemblies 30 are distributed around the circumference of the central retaining element 32. In contrast to the embodiments described above, the picking rolls 34', 36' of each picking assembly 30 and the slots 38 remaining between them, are indexed through 90°. Thereby the longitudinal axes of the picking rolls 34', 36' extend tangentially to the circumference of the retaining element 32. Both picking rolls 34', 36' of each picking assembly 30 are pointed in a conical shape in their outer end region, in order to simplify the entry of the stalk of a plant 48 into the slot 38. The radially outer surface 39 of the central retaining element 32 extends in an arc between the ends of an outer picking roll 36' of a first leading picking assembly 30 and the outer point of the inner picking roll 34' of a second following picking assembly 30, in order to simplify an automatic entry of the stalk of a plant 48. In this embodiment the grasping of the stalk of a plant 48 is simplified, since the longitudinal direction of the slot 38, into which it is drawn, and the direction of movement of the picking device 16 coincide. The picking devices 16, according to the second and third embodiment, can be used without any other change in the gathering and picking units 10 illustrated in FIGS. 1 through 3.

FIG. 7 shows a gathering and picking unit 10 with a fourth embodiment of a picking device 16. Above the picking device 16, an upper gathering device 14 is arranged which corresponds to that shown in FIGS. 1 through 3. Underneath the gathering device 14 the picking device 16 is arranged, which is equipped with eight picking rolls 58. The picking rolls 58 are barrel-shaped and provided with a surface containing drivers extending axially. The picking rolls 58 are distributed around the circumference of the central retaining element 32. Their longitudinal axes extend tangentially to the circumference of the retaining element 32. The picking rolls 58 are rotated in such a way about their longitudinal axes that in each case the outer part of the picking roll 58 at any one time moves downward. A stalk of a plant 48 is drawn in by interaction with a fixed wall 60 of a housing 56 arranged underneath the sheet metal stripper plate 20. The wall 60 encloses one part of the circumference of the picking device 16 in a circular shape, so that a semi-circular slot 62 of at least approximately constant width remains between the wall and the picking rolls 58. The curvature of the wall 60 and the barrel-shaped picking roll 58 conform to each other. The picking rolls 58 draw the stalks of the plants 48 into the slot 62. Above the picking device 16 and underneath the gathering device 14 the sheet metal stripper plate 20 with the picking channel 22 is arranged. In this embodiment of the invention the shape of the picking channel 22 corresponds to the circular-arc shape of the slot 62.

The method of operation of the gathering and picking arrangement 10 according to FIG. 7 is as follows. When the harvesting assembly, to which the gathering and picking unit 10 is attached, is driven forward, the stalk of a plant 48 is grasped by the leading surface of a finger 28 of the gathering device 14 and is pressed into the picking channel 22 (see FIG. 2) and into the slot 62 by interaction with the correspondingly curved forward edge of the sheet metal stripper plate 20. Sometimes the stalk of the plant 48 rounds the point of the finger 28 and comes into contact with the back side of the finger 28, which curves inward and conveys aggressively. It would be conceivable that another form of the finger 28 be selected in the case of the other embodiments of the invention, in particular one with a forward side with aggressive conveying performance. When the stalk of the plant 48 is in the slot 62, it is grasped by a picking roll 58 of the picking device 16 rotating about the high axis, and drawn in downward. Thereby, useful plant components are separated by means of the sheet metal stripper plate 20 and transported away, for example, conducted to the trough 52 of the screw conveyor 50. It could be found to be appropriate to equip the picking rolls 58 with means for grasping and retaining the stalk of a plant 48, for example, projecting drivers or to configure them as toothed rolls. This makes it possible to grasp the stalk of a plant 48 with the picking rolls 58 upstream of the slot 62.

The invention should not be limited by the above-described embodiments, but should be limited solely by the claims that follow.

We claim:

1. A gathering and picking unit for a harvesting assembly comprising a picking roll rotating about a first axis, that is arranged to draw plants through a picking channel through which parts of the plants are separated, characterized by the picking roll being fastened to a moving element that is rotating about a second axis that differs from the first axis.

2. A gathering and picking unit as defined by claim 1 wherein the picking roll is arranged to transport the plants over the length of the picking channel.

3. A gathering and picking unit as defined by claim 2 wherein the second axis extends approximately vertically.

4. A gathering and picking unit as defined by claim 3 wherein the first axis extends approximately horizontally.

5. A gathering and picking unit as defined by claim 4 wherein the moving element is a retaining element having the picking roll, the retaining element having an outer portion, the picking roll being arranged about the outer portion of the retaining element.

6. A gathering and picking unit as defined by claim 5, wherein the picking unit is provided with a leading picking roll and a trailing picking roll, a picking slot is located between the leading picking roll and the trailing picking roll, the leading picking roll and the trailing picking roll rotating in the opposite directions, the picking slot extends at least approximately radially to the retaining element.

7. A gathering and picking unit as defined by claim 5, wherein the picking unit is provided with a leading picking roll and a trailing picking roll, a picking slot is located between the leading picking roll and the trailing picking roll, the leading picking roll and the trailing picking roll rotating in the opposite directions, the picking slot extends at least approximately tangentially to the circumference of the retaining element.

8. A gathering and picking unit as defined by claim 5, characterized by a slot that is defined between the picking roll and a fixed wall, the slot extending tangentially.

9. A gathering and picking unit as defined by claim 5, characterized by a slot that is defined between the picking roll and a fixed wall, the slot extending radially to the circumference of the retaining element (32).

10. A gathering and picking unit as defined by claim 9 wherein the fixed wall is arranged at the retaining element.

11. A gathering and picking unit as defined by claim 9 wherein the fixed wall is stationary.

12. A gathering and picking unit as defined by claim 5 wherein the picking unit is provided with a leading picking roll and a trailing picking roll, the leading picking roll is provided a cone-shaped point and the trailing picking roll is provided with an outer section that is equipped with a spiral-shaped driver in order to draw in the stalk of a plant.

13. A gathering and picking unit as defined by claim 12 wherein the retaining element is provided with a first leading picking unit and a second trailing picking unit and a radially outer surface extends between the first leading picking unit and the second trailing picking unit, the radially outer surface is shaped to introduce the stalk of a plant into the second trailing picking unit.

14. A gathering and picking unit as defined by claim 13 wherein a rotating upper gathering device having a rejecting conveying performance is arranged above the picking unit and is configured to grasp plants independent of rows and to introduce them into the picking channel.

15. A gathering and picking unit as defined by claim 14 wherein the upper gathering device is arranged to transport the plant over the effective length of the picking channel.

16. A gathering and picking unit as defined by claim 15 wherein the picking channel is formed in a sheet metal stripper plate arranged above the picking device.

17. A gathering and picking unit as defined by claim 16 wherein the picking channel extends along an arc.

* * * * *